G. H. FRYE.
COLLAPSIBLE WAGON SEAT.
APPLICATION FILED AUG. 11, 1919.
1,335,678.
Patented Mar. 30, 1920.
2 SHEETS—SHEET 2.
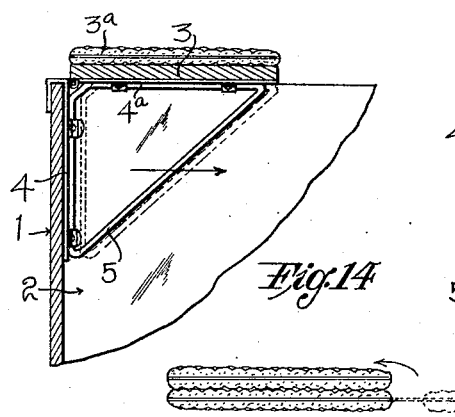
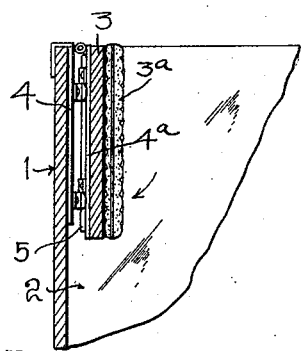
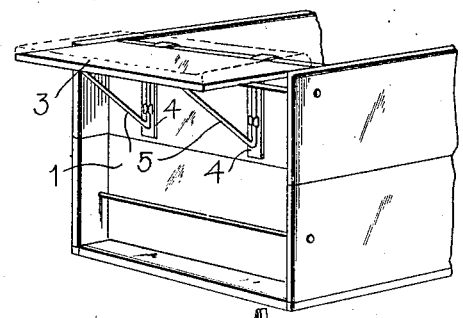
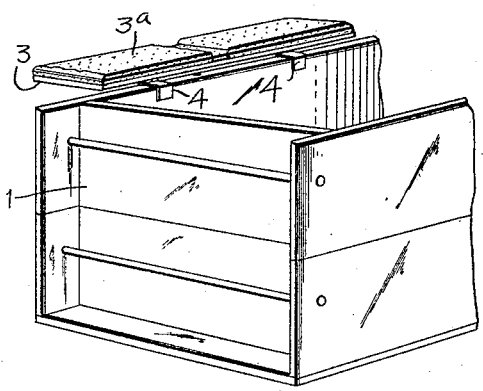
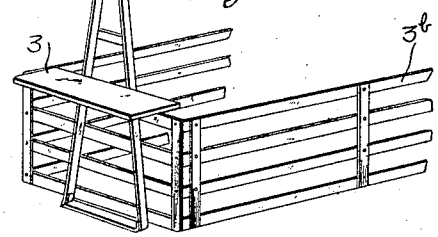
Inventor
George H. Frye
By A. L. Hough
Attorney

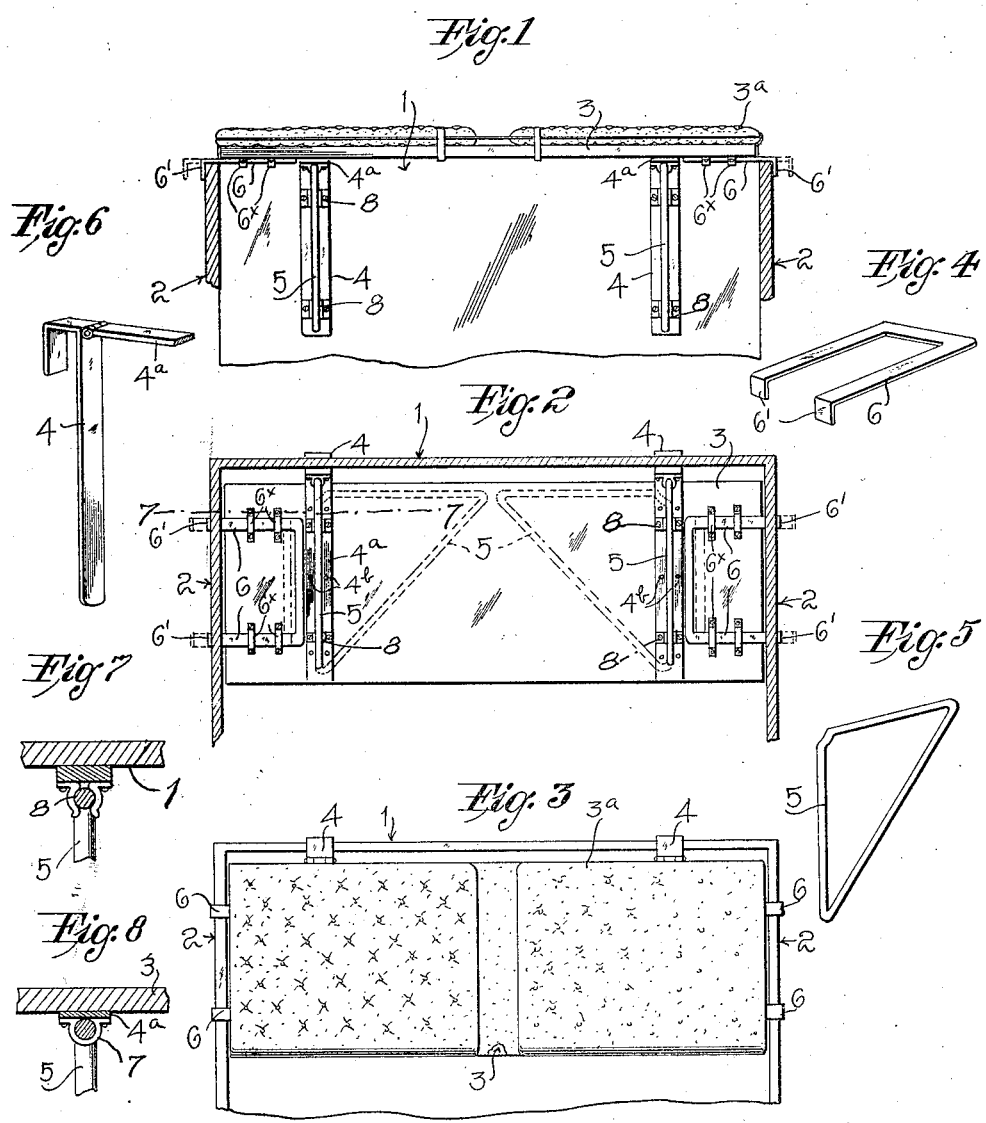

UNITED STATES PATENT OFFICE.

GEORGE HENRY FRYE, OF HAVANA, ILLINOIS.

COLLAPSIBLE WAGON-SEAT.

1,335,678.   Specification of Letters Patent.   Patented Mar. 30, 1920.

Application filed August 11, 1919. Serial No. 316,643.

*To all whom it may concern:*

Be it known that I, GEORGE HENRY FRYE, a citizen of the United States, residing at Havana, in the county of Mason and State of Illinois, have invented certain new and useful Improvements in Collapsible Wagon-Seats, of which the following is a specification, reference being had therein to the accompanying drawing.

This invention relates to new and useful improvements in adjustable folding wagon seats, and consists of a simple and efficient device of this nature adapted to be applied in different ways to wagon boxes, and consists of various details of construction, combination and arrangement of parts which will be hereinafter fully described, shown in the accompanying drawings and then specifically defined in the appended claims.

My invention is illustrated in the accompanying drawings which, with the letters of reference marked thereon, form a part of this application, and in which:

Figure 1 is a transverse vertical sectional view showing the application of my seat upon a wagon box.

Fig. 2 is a bottom plan view.

Fig. 3 is a top plan view.

Fig. 4 is a detail perspective of a seat supporting member.

Fig. 5 is a similar view of a seat supporting bracket.

Fig. 6 is a perspective view of a hinged member for attachment to the seat and support for the hinged member.

Fig. 7 is a sectional view on line 7—7 of Fig. 2.

Fig. 8 is a sectional view through the part of a bracket member which has permanent pivotal connections with the seat.

Fig. 9 is a vertical sectional view through one side of the box and seat with pad therefor.

Fig. 10 is a vertical sectional view showing the seat and pad folded.

Figs. 11, 12 and 13 are detail perspectives, showing different ways of applying the seat to a wagon box and hay rack, and Fig. 14 is a detail view showing the seat pad folded.

Reference now being had to the details of the drawings by numerals:

1 designates the front end of a wagon box and 2 the sides. 3 designates a seat which is fastened by bolts $4^b$ to bars $4^a$, one of which is shown in Fig. 6 of the drawings, and which has hinged connection with an inverted L-shaped supporting member 4 adapted to fit over the upper edges or sides of the box in the manner shown in Fig. 9 of the drawings. Braced bracket members 5 are pivotally mounted in the bearings 7 (detail of one of which is shown in Fig. 8), secured to the bars $4^a$ which supports the seat 3. Resilient clamping members 8 concaved on their inner faces, (details of which are shown in Fig. 7) spaced apart, are secured to said bars 4, and the braced bracket members 5 are designed to spring into said members 8 and frictionally hold the same in pivotal relation, permitting said braced brackets to fold in the manner shown in dotted lines in Fig. 2 of the drawings, when the seat is not in use.

U-shaped members 6, detail of one of which is shown in Fig. 4 of the drawings, have angled ends 6′, designed to engage over the opposite sides of the wagon box in the manner shown in Fig. 1 of the drawings, said member 6 being held in different adjusted positions through the medium of the keepers $6^x$, being adapted to fit boxes of various widths. A pad or cushion is designated in the drawings by numeral $3^a$ and is made in any suitable manner and secured at the seat in any approved manner.

In Fig. 11 of the drawings the seat is shown as applied to the forward end of a wagon box, and in Fig. 12 the seat is shown as applied to one side, and in Fig. 13 to the forward end of a hay rack $3^b$.

By the provision of an adjustable seat for wagon boxes made in accordance with my invention, it will be noted that the same may be easily and quickly applied in the various ways, to the forward ends or sides of the box, and being adjustable, is adapted to fit wagon boxes of different widths, and when the seat is not in use may be reduced to a compact shape in the manner designated in the drawings.

What I claim to be new is:

1. An adjustable collapsible seat for farm wagon boxes, etc., comprising a seat, inverted hook members adapted to engage over the upper edge of the box, bars hinged to said members, said seat supported thereby, bracket members pivotally connected to said bars and having detachable pivotal connection with said members.

2. An adjustable collapsible seat for farm wagon boxes, etc., comprising a seat, inverted hook members adapted to engage over the upper edge of the box, bars hinged to said members, said seat supported thereby, bracket members pivotally connected to said bars and having detachable pivotal connection with said members, adjustable means secured to the seat to engage opposite sides of the wagon box.

3. An adjustable collapsible seat for farm wagon boxes, etc., comprising a seat, inverted hook members adapted to engage over the upper edge of the box, bars hinged to said members, said seat supported thereby, bracket members pivotally connected to said bars and having detachable pivotal connection with said members, adjustable U-shaped members mounted upon the seat, and having angled ends designed to engage over the tops of the opposite sides of the wagon box.

4. An adjustable collapsible seat for farm wagon boxes, etc., comprising a seat, inverted hook members adapted to engage over the upper edge of the box, bars hinged to said members, said seat supported thereby, bracket members pivotally connected to said bars, resilient clamping devices upon said member for engagement with the bracket members with which they have pivotal connection.

5. An adjustable collapsible seat for farm wagon boxes, etc., comprising a seat, inverted hook members adapted to engage over the upper edge of the box, bars hinged to said members, said seat supported thereby, bracket members pivotally connected to said bars, resilient clamps concaved on their inner faces and secured to said member spaced apart and with said braces have detachable pivotal connection.

In testimony whereof I hereunto affix my signature in presence of two witnesses.

GEORGE HENRY FRYE.

Witnesses:
   A. D. CULLINANE,
   GENEVIEVE WEATHERFORD.